(12) United States Patent
Williams et al.

(10) Patent No.: US 11,561,120 B2
(45) Date of Patent: Jan. 24, 2023

(54) DOUBLE-SIDED MEASURING SCOOP

(71) Applicant: NUTRA HOLDINGS INC., St. John's (CA)

(72) Inventors: John Williams, St. John's (CA); Katherine Boland, St. John's (CA); Zachary Meaney, St. John's (CA)

(73) Assignee: Nutra Holdings Inc., St. John's (CA)

( * ) Notice: Subject to any disclaimer, the term of this patent is extended or adjusted under 35 U.S.C. 154(b) by 0 days.

(21) Appl. No.: 17/666,644

(22) Filed: Feb. 8, 2022

(65) Prior Publication Data

US 2022/0260405 A1   Aug. 18, 2022

Related U.S. Application Data

(60) Provisional application No. 63/149,781, filed on Feb. 16, 2021.

(51) Int. Cl.
 *G01F 19/00* (2006.01)

(52) U.S. Cl.
 CPC .................. *G01F 19/002* (2013.01)

(58) Field of Classification Search
 CPC .............................. G01P 19/002; G01F 19/002
 See application file for complete search history.

(56) References Cited

U.S. PATENT DOCUMENTS

| | | | | |
|---|---|---|---|---|
| 2,654,252 A * | 10/1953 | Davis | ..................... | A47G 21/04 73/426 |
| 2,683,374 A * | 7/1954 | Finley | ..................... | A47G 21/04 73/426 |
| 6,866,511 B1 * | 3/2005 | Harris | ..................... | G09B 19/00 235/103 |
| 2012/0000286 A1 * | 1/2012 | Binns | ..................... | G01F 19/002 73/426 |

FOREIGN PATENT DOCUMENTS

| | | | |
|---|---|---|---|
| CH | 345469 A | | 3/1960 |
| CN | 105708277 A | | 6/2016 |
| DE | 202013007333 U | * | 8/2014 |
| DE | 102014012039 A1 | | 2/2015 |
| JP | H0669750 U | * | 9/1994 |
| KR | 20130006315 U | | 5/2014 |

OTHER PUBLICATIONS

Co-pending Design U.S. Appl. No. 29/825,949, filed Feb. 8, 2022.

* cited by examiner

*Primary Examiner* — Jamel E Williams
(74) *Attorney, Agent, or Firm* — Piece Atwood LLP

(57) ABSTRACT

A double-sided measuring scoop is provided. The double-sided measuring scoop includes a cylindrical member having a cylindrical sidewall and a substantially planar disc-shaped member positioned within the cylindrical member. The disc-shaped member divides the cylindrical member into a first scoop portion having a first volume, and a second scoop portion having a second volume, where the first volume is larger than the second volume. The double-sided measuring scoop also includes a handle coupled to the cylindrical sidewall at a location directly opposite the disc-shaped member.

7 Claims, 3 Drawing Sheets

DOUBLE-SIDED MEASURING SCOOP

RELATED APPLICATIONS

The present application claims the benefit under 35 U.S.C. § 119(e) to U.S. Provisional Application No. 63/149,781 filed on Feb. 16, 2021, the contents of which is incorporated by reference herein in its entirety.

FIELD OF THE INVENTION

This disclosure relates to a scoop which may be used to measure various liquids and solids.

BACKGROUND

There are a variety of powdered products that are sold in a canister or other container. Examples of powdered products include powdered beverages and nutritional powders. Inside of the container there is typically a scoop to measure out a portion of the powdered product. The scoop is generally sized for a single serving of the powdered product.

SUMMARY

A double-sided measuring scoop is provided. The double-sided measuring scoop includes a cylindrical member having a cylindrical sidewall and a substantially planar disc-shaped member positioned within the cylindrical member. The disc-shaped member divides the cylindrical member into a first scoop portion having a first volume, and a second scoop portion having a second volume, where the first volume is larger than the second volume. The double-sided measuring scoop also includes a handle coupled to the cylindrical sidewall at a location directly opposite the disc-shaped member.

DETAILED DESCRIPTION

The present disclosure is directed to a double-sided measuring scoop. As set forth in more detail below, on one side of the scoop there is a first scoop portion, and on the other opposite side of the scoop, there is a second scoop portion. The first scoop portion has a different sized volume in comparison to the volume of the second scoop portion. The user can choose which sized portion to use.

Aspects of the present disclosure are directed to a double-sided measuring scoop that has a simple design that is easy to manufacture. As set forth in more detail below, the double-sided scoop may include a cylindrical member having a cylindrical sidewall which forms the sidewalls of both the first scoop portion and the second scoop portion. Furthermore, the scoop may include a disc-shaped member positioned within the cylindrical member which divides the cylindrical member into the first and second scoop portions.

The inventors recognized that it was desirable to have a single scoop that provided an easy way to measure different sized portions. As set forth in more detail below, the inventors also recognized a way to use the handle of the scoop to provide a visual indication of the boundary between the two different sized scoop portions. As set forth below, this allows the user to more easily and/or quickly determine the desired scoop portion.

Figure 1:
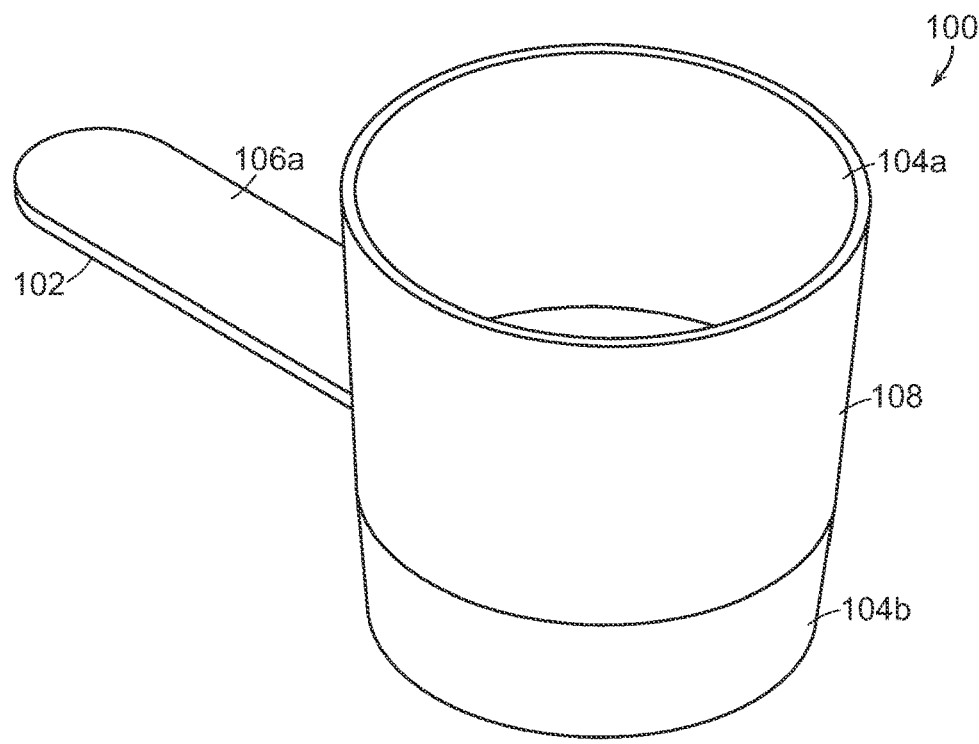
FIG. 1 is a perspective view of a first side of a double-sided measuring scoop according to one embodiment.
Figure 2:
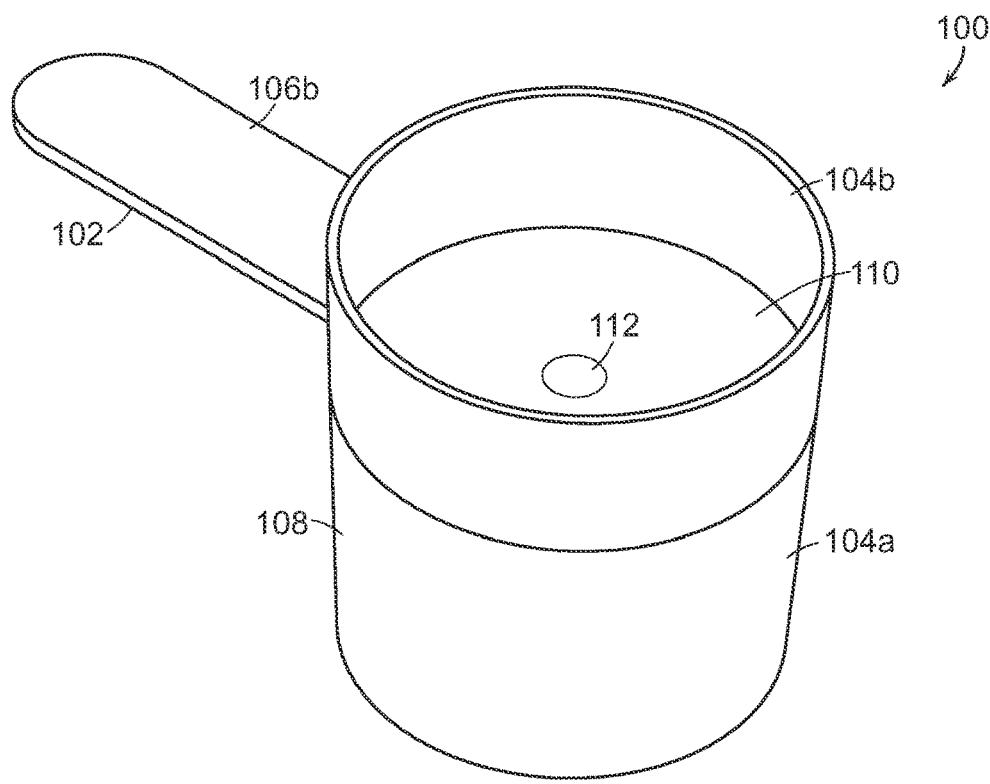
FIG. 2 is a perspective view of a second side of a double-sided measuring scoop according to one embodiment.

Turning now to the drawings, FIGS. 1-2 illustrate one embodiment of a double-sided scoop 100. As shown in FIG. 1, on a first side of the double-sided scoop 100 is a first scoop portion 104a. As shown in FIG. 2, on a second side of the double-sided scoop 100 is a second scoop portion 104b. In one embodiment, the first scoop portion 104a may form a first cavity having a first volume (i.e. a full portion) and the second scoop portion 104b may form a second cavity having a second volume (i.e. half portion) that is smaller than the first volume. In one embodiment, the volume of the first scoop portion 104a is approximately double the volume of the second scoop portion 104b. In another embodiment, the volume ratio may differ from 2:1, and may, for example, be 3:2, 3:1, 4:1, as the disclosure is not so limited.

Furthermore, as shown in FIG. 2, a substantially planar disc-shaped member 110 may separate the first scoop portion 104a from the second scoop portion 104b. As shown in FIGS. 1-2, the first and second scoop portions 104a, 104b are formed by a cylindrical member 108. In particular, the cylindrical sidewall of the cylindrical member 108 may form the sidewalls of both the first and second scoop portions 104a, 104b, and the disc-shaped member 110 may form the bottom of both the first and second scoop portions 104a, 104b. In one embodiment, the disc-shaped member 110 is substantially perpendicular to the cylindrical sidewall of the cylindrical member 108.

One of ordinary skill in the art will appreciate that the double-sided scoop 100 may, for example, be used to accurately measure portions of a nutritional powder. In some embodiments, the double-sided measuring scoop 100 may be provided within a hermetically sealed canister or other container (not shown) of nutritional powder. It should be recognized that in another embodiment, the double-sided scoop 100 may be used to measure various solids and liquids, including, but not limited to foods, beverages, and nutritional supplements.

As shown in FIGS. 1-2, the double-sided scoop 100 also includes a handle 102 which is coupled to an outer region of the cylindrical sidewall at a location directly opposite to a the location where the disc-shaped member 110 is attached to an inner region of the cylindrical sidewall. In this respect, the handle 102 provides a visual indication of the boundary (i.e. divider) between the two different sized scoop portions 104a, 104b. This allows the user to more easily and/or quickly determine the desired scoop portion by either simply looking at the handle, or when holding the handle in their hand.

As shown in FIGS. 1-2, in one illustrative embodiment, the handle 102 is a substantially planar extension that includes a first planar surface 106a, and a second planar surface 106b. In one embodiment, the handle 102 is designed such that at least one of the first planar surface 106a and the second planar surface 106b are aligned with the disc-shaped member 110 which forms the bottom of the first and second scoop portions 104a, 104b.

Figure 3B:
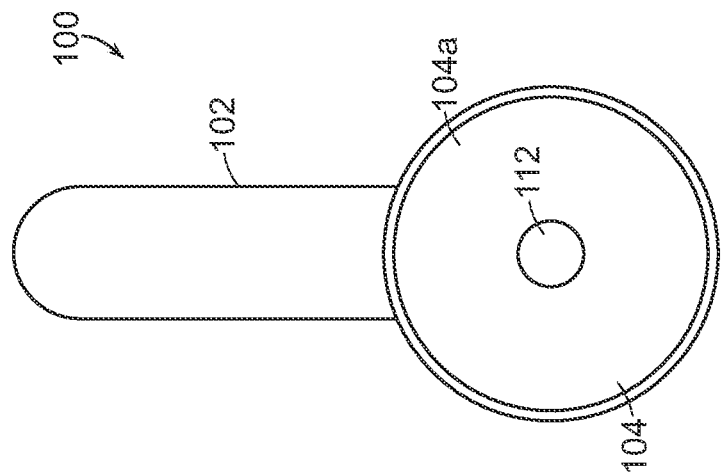
FIG. 3B is a top view of the double-sided measuring scoop shown in FIG. 3A.
Figure 3A:
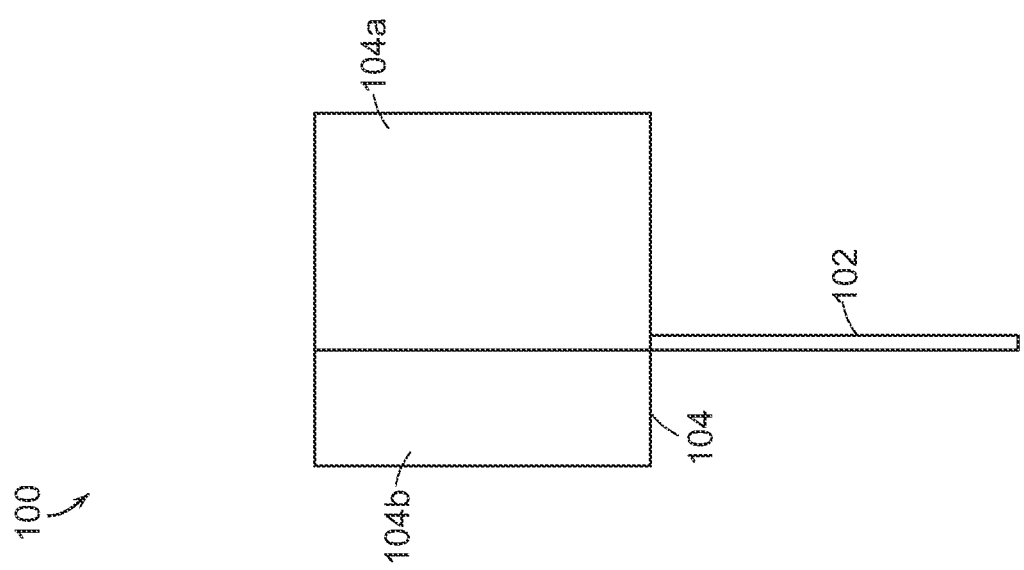
FIG. 3A is a side view of a double-sided measuring scoop according to one illustrative embodiment.
Figure 3D:
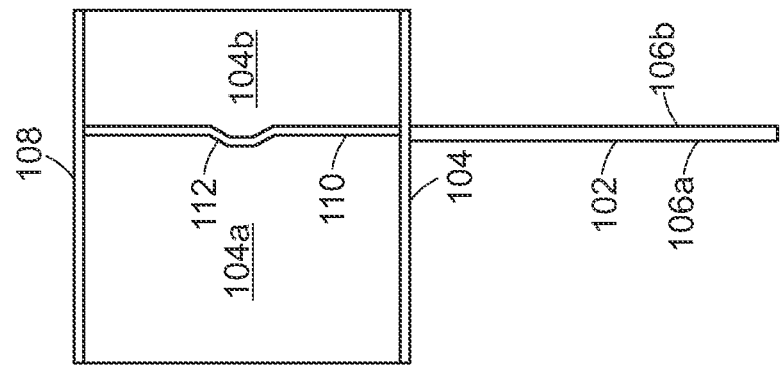
FIG. 3D is a cross-sectional view of the double-sided measuring scoop shown in FIG. 3A.
Figure 3C:
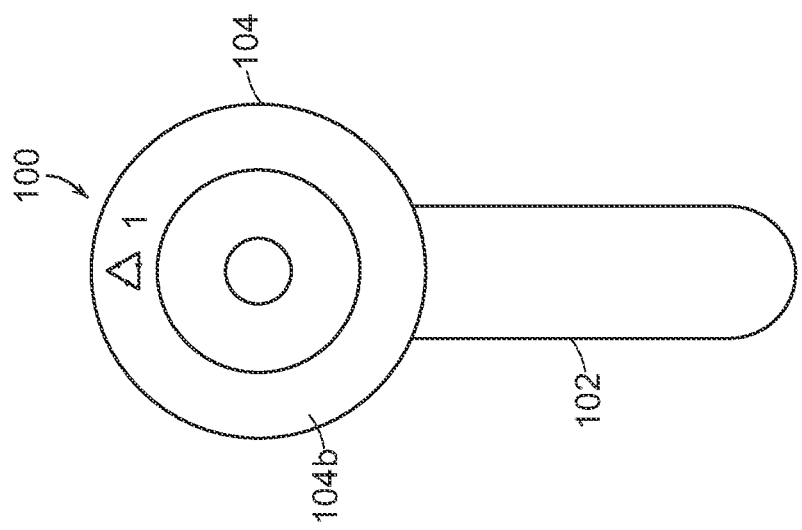
FIG. 3C is a bottom view of the double-sided measuring scoop shown in FIG. 3A.

Turning now to FIGS. 3A-3D, additional views of one embodiment of a double-sided measuring scoop 100 will now be described. FIG. 3A illustrates a side view of the scoop 100, FIG. 3B illustrates a top view, FIG. 3C illustrates a bottom view of the scoop 100, and FIG. 3D illustrates a cross-sectional view of the scoop 100. As shown in FIG. 3D, in one embodiment, the handle 102 is substantially perpendicular to the cylindrical sidewall of the cylindrical member 108. Furthermore, in the embodiment illustrated in FIGS. 3A and 3D, the handle 102 may be substantially parallel to the disc-shaped member 110.

As also shown in FIG. 3D, in one embodiment, the handle 102 is designed such that a first planar surface 106a of the handle 102 is aligned to be located directly opposite a first side of the disc-shaped member 110 which forms the bottom of the first scoop portion 104a, and the second planar surface 106b of the handle 102 is aligned to be located directly opposite a second side of the disc-shaped member 110 which forms the bottom of the first scoop portion 104b. In this respect, the first planar surface 106a and the second planar surface 106b of the handle 102 are aligned to provide a visual indication of the depth of each of the first and second scoop portions 104a, 104b. This allows the user to more easily and/or quickly determine the desired scoop portion.

It should be recognized that a variety of types of materials may be used to make the double-sided measuring scoop 100 including, but not limited to various plastics, metals and glass materials. In one embodiment, the material is FDA compliant and is free of heavy metals, CFC's and BPA, and complies with EU food contact legislation when used in food packaging applications. In one embodiment, the scoop 100 is made of polypropylene. In one embodiment, the scoop 100 has a single-piece construction, such that the cylindrical member 108, the disc-shaped member 110, and the handle 102 are integrally formed. For example, it is contemplated that the scoop 100 is made of an integrally molded plastic material.

As shown in FIGS. 2, 3B, and 3D, in one embodiment, the substantially planar disc-shaped member 110 may include a small concave portion 112. As shown, this concave portion 112 may be in the center of the disc-shaped member 110 and may be formed during the injection molding manufacturing process. As shown in FIG. 3D, the concave portion 112 may include a raised bump extending into the first scoop portion 104a and a concavity on the side of the disc-shaped member 110 facing the second scoop portion 104b.

In one embodiment, the double-sided measuring scoop 100 may include indicia (not shown) such as, but not limited to text, embossing, symbols, and/or colors on opposite sides to indicate the different volumes of the first scoop portion 104a and the second scoop portion 104b. For example, in one embodiment, the first scoop portion 104a may include text, such as "46cc", to indicate that the first volume is approximately 46 cubic centimeters, and the second scoop portion 104b may include text, such as "23cc", to indicate that the second volume is approximately 23 cubic centimeters. In one embodiment, such indicia may be provided on the handle 102 and/or on the cylindrical member 108, and/or on the disc-shaped member 110.

The exact dimensions of the double-sided measuring scoop 100 may vary, but in one embodiment, the height of the first scoop portion 104a is about 31 mm, and the height of the second scoop portion 104b is about 16 mm. In one embodiment, the inside diameter of the cylindrical member 108 is about 43 mm, and the outside diameter of the cylindrical member 108 is about 46 mm. In one embodiment, the handle 102 is about 51 mm in length and is about 18 mm in width.

In one embodiment, the ratio of the distance between the handle 102 and one end of the cylindrical member 108 to the distance between the handle 102 and the other end of the cylindrical member 108 is substantially equal to the ratio of the volumes of the two scoop portions 104a, 104b. For example, in one embodiment, the distance between the first planar surface 106a of the handle 102 and the end of the cylindrical member 108 that forms the walls of the first scoop portion 104a is about 32 mm, and the distance between the second planar surface 106b of the handle 102 and the end of the cylindrical member 108 that forms the walls of the second scoop portion 104b is about 16 mm. The ratio of these two distances is 2:1. As mentioned above, in one embodiment, the volume of the first scoop portion 104a (i.e. first volume) is 46 cc and the volume of the second scoop portion 104b (i.e. second volume) is 23 cc. Thus, the 2:1 ratio of these distances is equal to the ratio of the volumes of the two scoop portions 104a, 104b. Thus, the handle 102 provides a visual indication of the volume ratio of the two scoop portions 104, 104b. It should be recognized that the 2:1 volume ratio is exemplary and that the disclosure also contemplates other volume ratios, such as, but not limited to 3:2, 3:1, 4:1.

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A double-sided measuring scoop comprising:
   a cylindrical member having a cylindrical sidewall;
   a substantially planar disc-shaped member positioned within the cylindrical member, the disc-shaped member dividing the cylindrical member into a first scoop portion having a first volume, and a second scoop portion having a second volume;
   wherein the first volume is larger than the second volume; and
   a handle coupled to the cylindrical sidewall at a location directly opposite the disc-shaped member; and
   wherein the center of the disc-shaped member includes a small concave portion.

2. The double-sided measuring scoop of claim 1, wherein the volume of the first scoop portion is approximate double the volume of the second scoop portion.

3. The double-sided measuring scoop of claim 1, wherein the handle is substantially perpendicular to the cylindrical sidewall of the cylindrical member.

4. The double-sided measuring scoop of claim 1, wherein the handle is substantially parallel to the disc-shaped member.

5. The double-sided measuring scoop of claim 1, wherein the disc-shaped member positioned within the cylindrical member is substantially perpendicular to the cylindrical sidewall of the cylindrical member.

6. The double-sided measuring scoop of claim 1, having a single-piece construction, such that the cylindrical member, the substantially planar disc-shaped member, and the handle are integrally formed.

7. The double-sided measuring scoop of claim 1, wherein the ratio of the distance between the handle and a first end of the cylindrical member to the distance between the handle and a second end of the cylindrical member is substantially equal to the ratio of the first volume to the second volume.

* * * * *